United States Patent [19]

Bleuer

[11] 4,356,434
[45] Oct. 26, 1982

[54] MULTIPLE COLOR SINGLE GUN TV PICTURE TUBE

[76] Inventor: Keith T. Bleuer, 1663 Wilshire Dr. NE., Rochester, Minn. 55901

[21] Appl. No.: 242,976

[22] Filed: Mar. 12, 1981

Related U.S. Application Data

[63] Continuation-in-part of Ser. No. 222,774, Jan. 6, 1981, which is a continuation-in-part of Ser. No. 186,234, Sep. 11, 1980, abandoned.

[51] Int. Cl.³ .............................................. H01J 29/80
[52] U.S. Cl. ....................................... 315/375; 358/66
[58] Field of Search ................... 315/375; 358/67, 66, 358/68, 69, 72; 313/461, 465, 466, 467, 469

[56] References Cited

U.S. PATENT DOCUMENTS

| | | |
|---|---|---|
| 2,683,769 | 7/1954 | Banning, Jr. . |
| 2,728,815 | 12/1955 | Kalfaian . |
| 2,875,375 | 2/1959 | Kruper et al. . |
| 2,888,593 | 5/1959 | Anderson et al. . |
| 3,043,987 | 7/1962 | Michlin . |
| 3,428,858 | 2/1969 | Glyptis . |
| 3,492,416 | 1/1970 | Weber . |

Primary Examiner—Theodore M. Blum

[57] ABSTRACT

A single electron gun cathode ray tube for producing color pictures comprising three types of small bodies or beads affixed on the inner surface of the viewing end of the tube. The beads of the three types have phosphors associated with them to produce red, green and blue light respectively. A tuned tank circuit is associated with each bead and comprises opposite capacitor plates connected by an inductor extending through the bead for causing the bead and its phosphor to be excited at a certain frequency of electron flow from the electron gun of the tube, so that three different frequencies of electron flow cause the three different types of beads to produce red, green and blue light emissions respectively.

18 Claims, 11 Drawing Figures

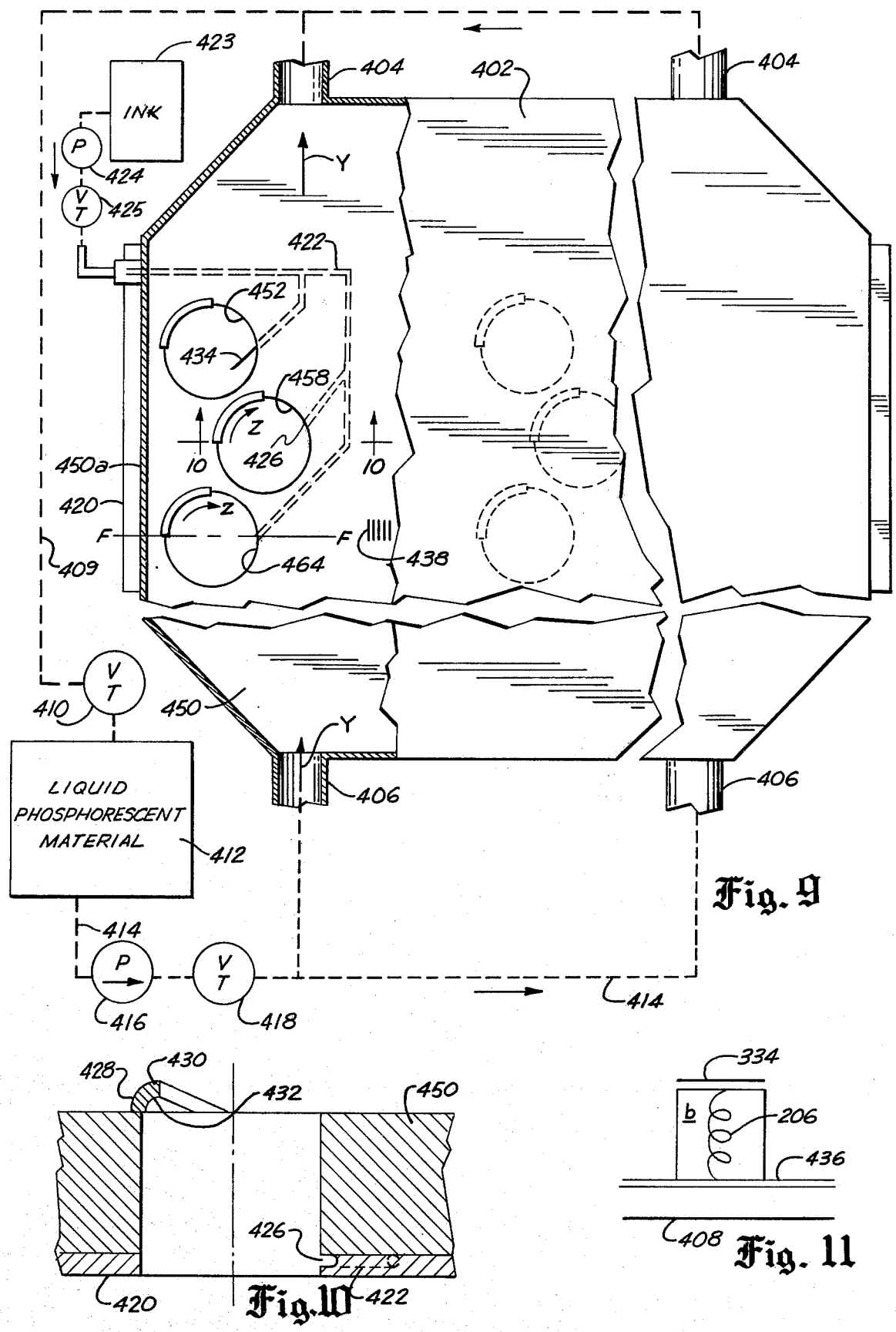

MULTIPLE COLOR SINGLE GUN TV PICTURE TUBE

CROSS REFERENCES TO RELATED APPLICATIONS

This application constitutes a continuation-in-part of application, Ser. No. 222,774, filed on Jan. 6, 1981, which in turn is a continuation-in-prt of application, Ser. No. 186,234, filed on Sept. 11, 1980 abandoned.

BACKGROUND OF THE INVENTION

The invention relates to color television (TV) picture tubes (cathode ray tubes) and more particularly to a tube of this type that utilizes only one electron gun.

Color television receivers commonly utilize picture tubes having three electron guns. A shadow mask is disposed in the tube between the guns and the internal surface of the viewing tube face, and the electron guns are disposed at the corners of an equilateral triangle in such a manner that the electrons from each gun pass through the mask to one spot of triplets of spots on the internal surface of the viewing tube face. The spots of each triplet are provided with phosphors that respectively provide red, green and blue lighted visual indications in the form of dots when energized by electrons, so that the electrons from one gun provide red dots, the electrons from the second gun provide green dots and the electrons from the third gun provide blue dots, on the viewing tube face.

SUMMARY OF THE INVENTION

It is an object of the present invention to provide an improved color TV picture tube that has only a single electron gun but yet provides different color visual indications on the viewing tube face, such as red, green and blue dots, so that the full color picture can be composed on the viewing tube face using only the single electron gun.

In a preferred form, the improved picture tube of the invention utilizes the basic picture tube used conventionally for black and white pictures, but with the homogeneous luminescent coating on the internal surface of the viewing tube face being replaced with small discrete bodies, particles, or beads of dielectric material which are made to be frequency responsive and which have different types of phosphors associated with them to produce different color light emissions when energized. Each of the beads has on opposite surfaces electrically conducting coatings or faces (in effect constituting opposite capacitor plates), and the beads provide inductance between the plates preferably by coiled inductance providing filaments (inductors) extending through the beads and electrically connecting the opposite coatings or faces together. The capacitor plates and inductors thus provide a tank circuit on each bead. The three thirds of the beads respectively provide red, green and blue visual indications or lighted dots on the viewing tube face and may be termed "red", "green" and "blue" beads respectively. These bead thirds have different numbers of the filaments, or alternatively their filaments may be equal in number and have different numbers of convolutions. The tank circuits of the "red", "green" and "blue" beads are thus made resonant at different frequencies, so that the "red" beads can be energized to produce light with a certain frequency component of the electron beam from the single electron gun, and the "green" and "blue" beads are likewise energized with components of other different frequencies of the electron beam. The electron beam can have the different frequency components supplied to it by means of three different oscillators which are modulated by the "red", "green" and "blue" analog signals conventionally fed to the "red", "green" and "blue" electron guns of the conventional shadow mask picture tube in a color TV receiving set.

BRIEF DESCRIPTION OF THE DRAWINGS

FIG. 9 is a top plan view of alternately usable apparatus, and including schematic showings of fluid transporting means connected with the apparatus, for forming the cylindrical beads illustrated in FIG. 7;

FIG. 10 is a sectional view on an enlarged scale taken on line 10—10 of FIG. 9; and FIG. 11 is a fragmentary view similar to FIG. 7 showing one of the cylindrical beads with an electrically conductive film disposed between the bead and the viewing end of the picture tube.

DESCRIPTION OF THE PREFERRED EMBODIMENTS

Figure 1:
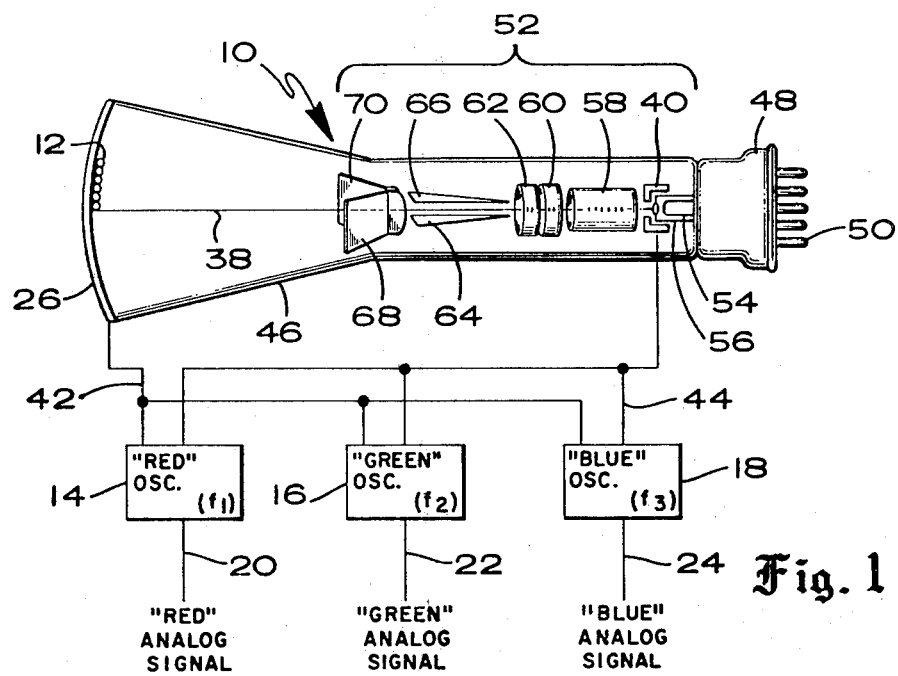
FIG. 1 is a diagrammatic view of the color TV picture tube of the invention coupled to three oscillators electrically driving the tube.

Referring to FIG. 1 in particular, the illustrated TV picture tube comprises a conventional single gun picture (cathode ray) tube 10 now used for black and white TV pictures in TV receiving sets built only for producing black and white TV pictures except that a new beaded fluorescent internal tube coating or screen 12 has been substituted for the homogeneous internal coating or screen of the balck and white picture tube. Also, the three oscillators 14, 16 and 18 have been substituted for other drive circuits now used in connection with the black and white tube. Otherwise, the tube as shown is used with a conventional color TV receiving set having the "red", "green" and "blue" analog signals which are on lines 20, 22 and 24 shown in FIG. 1. In a conventional color TV set, these analog signals are applied to the conventional shadow mask color display tube in the color TV receiving set.

The tube coating 12 is applied on the large curved tube end or tube face porton 26 which is of ordinary electrically non-conductive transparent glass and on which the color picture is viewed. The coating comprises spherical small bodies, particles or beads R, G and B which when excited electrically produce red, green, and blue light respectively constituting respectively "red", "green" and "blue" sets of components on the tube end 26. The beads R, G and B are fixed in any suitable way on the inner surface of the tube end 26. The beads R, G and B are of dielectric material and are impregnated or coated with the phosphors that produce these colors when electrically excited. The constitutents of such phosphors are well known, and the phosphors may be of the same types as used in shadow mask color TV picture tubes. There are equal numbers of the beads R, G and B; and the beads R, G and B are uniformly distributed on the entire inner surface of the tube end 26. The beads R, G and B are in contact with the internal surface of the tube end 26 so that when any of the beads are electrically excited, a dot of light will shine or be apparent through the tube end 26. A conductive layer 28 of metal or the like is on the internal surface of the tube end 26 and extends inwardly of the tube 10 for less than the radii of the spheres R, G and B. The layer 28 is discontinuous to allow the beads R, G and B to contact the internal surface of the tube end 26.

The beads R have electrically conductive platings 30 on their surfaces inside the tube 10 and remote from the tube end 26, and the beads G and B have corresponding platings 32 and 34. An electron shield 35, such as of deposited non-conductive plastic, partially surrounds the platings 30, 32 and 34; leaving most of the surfaces of the platings exposed to the inside of the tube 10 but shielding the surfaces of the beads R, G and B not covered by the platings to the incidence of electrons. The platings 30 and the opposite faces 30a of the layer 28 with which the beads R are in contact constitute electrical capacitor plates in effect, and a plating 30 and the opposite face 30a make up an electrical capacitor. Likewise, the platings 32 and 34, together with the faces 32a and 34a, form similar capacitors in connection with the beads G and B. Spirally coiled electrically conductive inductance forming threads or filaments 36, which may be termed "inductors", are cast or otherwise provided in the beads R, G and B. The ends of some of these filaments 36 are in contact with the platings 30, 32 and 34 and with the opposite internal faces 30a, 32a and 34a of the layer 28 so that the filaments 36 electrically connect and bridge the platings 30, 32 and 34 with the opposite internal faces 30a, 32a and 34a and thus form electrical tank circuits a, b and c, one for each of the beads R, G and B. An electrical tank circuit comprises a capacitor having two opposite capacitor plates and an inductor having its opposite ends electrically connected to the two plates. A source of electrical current is connected to the two plates of the capacitor. The tank circuit a for each bead R comprises the plating 30 and the opposite face 30a for the bead functioning as opposite capacitor plates and coiled filaments 36 as inductors connecting the plating 30 and face 30a. The electron beam 38 of the tube 10 and the layer 28 constitute the source of electrical current connected to the layer 30 and face 30a functioning as the two capacitor plates. Each of the beads G is a part of a similar tank circuit b, and each of the beads B is a part of a similar tank circuit c.

There are more of the filaments 36 in the beads G than in the beads R, and there are more of the filaments 36 in the beads B than in the beads G; and in each case the filaments 36 are uniformly and randomly dispersed in the beads R, G and B. The tank circuits a for the beads R are thus made to be tuned or resonant for the frequency $f_1$; the tank circuit b for the beads G are thus made resonant for the different frequency $f_2$; and the tank circuits c are thus made resonant for the still different frequency $f_3$. The oscillators 14, 16 and 18 respectively produce output signals at the different frequencies of $f_1$, $f_2$ and $f_3$. As is well known, the following equation is satisfied when a circuit containing inductance and capacitance is in resonant condition:

$$2 pi f L = 1/(2 pi f C)$$

in which f is the frequency of resonance, L is the inductance of the circuit and C is the capacitance of the circuit. The current through the filaments 36 of any of the tank circuits a, b or c is at a maximum at the frequency of resonance and is insubstantial at other frequencies, so that the respective beads R, G and B and particularly the phosphors of these beads are energized and excited at the frequencies of resonsance to cause them to emit light.

Thus the output of the oscillator 14 will energize the beads R but not the beads G and B, and the outputs of the oscillators 16 and 18 will exclusively enenergize the beads G and B. The oscillators 14, 16 and 18 will thus cause the beads R, G and B to glow and produce red, green and blue dots of light visible through the tube end 26. The outputs of the oscillators 14, 16 and 18 are transmitted on the electron beam 38 of the tube 10, and the control electrode 40 of the tube 10 is connected to the oscillators 14, 16 and 18 for this purpose. The oscillators 14, 16 and 18 are connected by line 42 to the layer 28 and by the line 44 to the control electrode 40 for completing the electrical circuit for energizing the beads. The outputs of the oscillators 14, 16 and 18 oscillate betwen plus and minus while the electrons in the beam 38 never change direction, but this is not of significance.

More specifically as to the tube 10, the tube 10 comprises the glass envelope 46 evacuated of air, the tube base 48 having electrical connector pins 50 protruding from it, the electron gun 52 comprising, in addition to the grid or control element or electrode 40 previously mentioned, the heater 54, the cathode 56, the first anode 58, the second anode 60 and the third anode 62, vertical electrostatic deflection plates 64 and 66, and horizontal electrostatic deflection plates 68 and 70. The electron gun is conventional in ordinary black and white single gun picture tubes and produces the electron beam 38 with the usual voltages applied on the elements just mentioned making up the gun 52. The conductive layer 28 has a high voltage applied to it from any suitable source (not shown) for accelerating the electrons in the beam 38 to the tube end 26.

In operation, the "red" analog signal applied from line 20 onto oscillator 14 modulates the amplitude output of the oscillator 14 on lines 42 and 44 and causes the electron beam 38 to be likewise amplitude modulated at the frequency $f_1$ at which the oscillator 14 oscillates. The electron beam 38 sweeps the tube end 26 both vertically and horizontally in accordance with the changing voltages applied on the plates 64, 66, 68 and 70 as is conventionally accomplished in TV receiving sets of both the black-white and color types. The R beads are thus selectively energized to light or glow to produce a "red" picture component of the complete color picture on the tube end or viewing face 26 which is made up as a whole of red, green and blue components. The "green" and "blue" analog signals on lines 22 and 24 likewise vary the amplitude outputs of the oscillators 16 and 18 respectively at the frequencies $f_2$ and $f_3$, and the beads G and B are likewise selectively energized over the tube end 26 to provide the green and blue picture components visible on the tube end 26. Thus the beads R, G and B are selectively energized by the current components of the electron beam 38 at the frequencies $f_1$, $f_2$ and $f_3$ and with the intensities of the analog signals on the lines 20, 22 and 24 to produce the complete, composite color picture viewable through the tube end 26.

Figure 2:
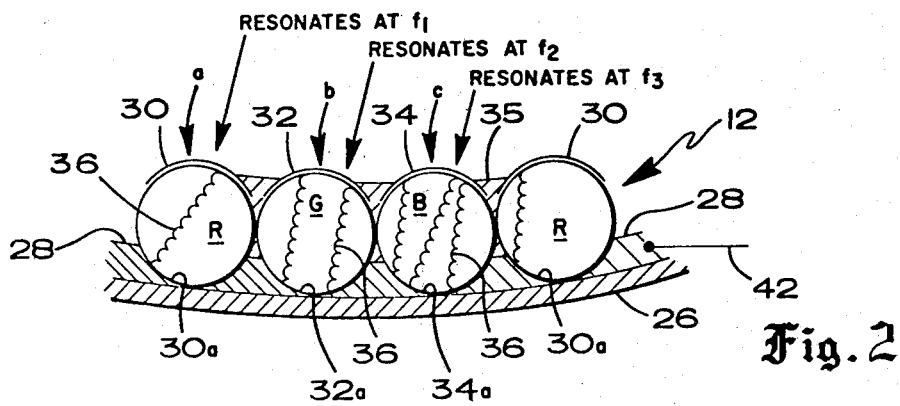
FIG. 2 is a view on an enlarged scale showing the red, green and blue light producing small bodies, particles, or beads on the internal surface of the picture tube viewing end which is of electrically non-conductive glass.
Figure 3:
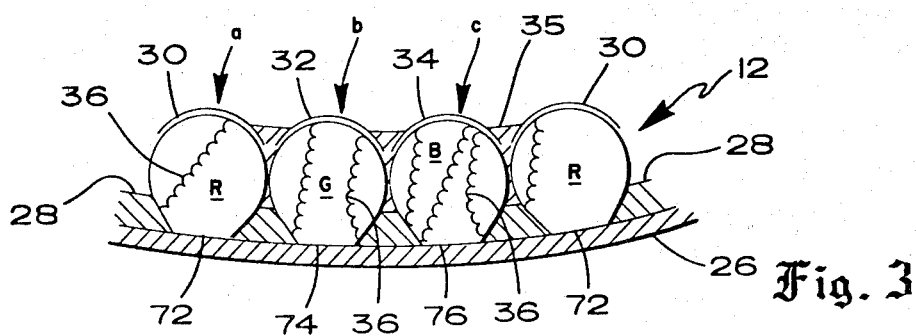
FIG. 3 is a view similar to FIG. 2 and showing alternately usable, non-spherical light producing beads on the internal surface of the viewing end of the picture tube.

The embodiment shown in FIG. 3 is the same as that of FIG. 2, except that the beads R, G and B are provided with the enlarged area faces 72, 74 and 76 that match in contour and are in face to face contact with the inner surface of the tube end 26. If the beads R, G and B are in somewhat pliable condition and are forcefully shot on to the inner face of the tube end 26 in being applied to it, the faces 72, 74 and 76 will be automatically formed. The beads R, G and B with the faces 72, 74 and 76 will provide larger area visible dots of light on the tube end 26 when the beads are electrically energized to provide a more intense color picture from the tube 10.

As is demonstrated by the FIG. 3 showing, the beads R, G and B can be other than true spheres while yet providing the three types of tank circuits (a, b and c in FIG. 2), each of which includes an essentially two plate capacitor with convoluted inductance forming elements electrically connecting the two plates. The different resonant frequencies of the tank circuits a, b and c can also be easily attained by providing the filaments 36 in the beads G with different numbers of convolutions than the filaments 36 in the beads R and by providing the filaments 36 in the beads B with different number of convolutions than the convolutions of the filaments 36 in the beads R and G. The filaments 36 in each of the beads R, G and B are preferably of the same lengths and should terminate on the outer surfaces of the beads R, G and B so that they make contact with the faces 30a, 32a and 34a and the platings 30, 32 and 34. Any suitable apparatus may be used for making the beads R, G and B in their original or final spherical forms, such as for example the apparatuses disclosed in Egli et al U.S. Pat. No. 3,957,933 for Apparatus For Producing Microspherical Particles And Method For Operating Such Apparatus and Jenkins U.S. Pat. No. 3,744,983 for Apparatus And Method For Forming Spheres From Molten Fusible Material.

Figure 4:
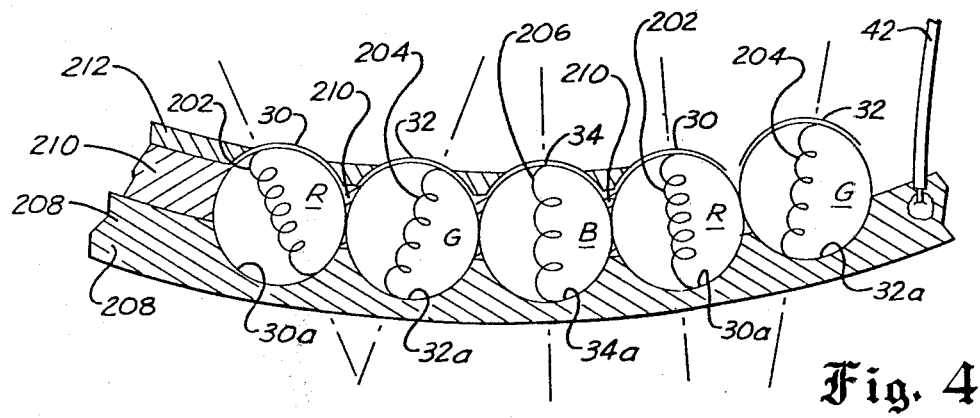
FIG. 4 is a view similar to FIG. 2 and showing alternately usable light producing beads disposed on an alternately usable electrically conductive tube face.

The beads R, G and B shown in FIG. 4 are spherical and of the same diameters in their final forms as they are in the FIG. 2 showing and illustrate a form of the invention in which the numbers of convolutions in the filaments are different. The beads R, G and B shown in FIG. 4 respectively have the single spirally coiled filament 202, 204 and 206 extending diametrically through them, and these filaments are composed of electrically conductive ink as will be further described in greater detail. The filaments 202, 204 and 206 have different numbers of convolutions, the filaments 202 being shown to have five convolutions, the filaments 204 being shown to have four convolutions and the filaments 206 being shown to have three convolutions. The beads R, G and B in FIG. 4 are embedded in the end or viewing face portion 208 of the tube 10 (the face portion 208 corresponds to the face portion 26 in the previously described forms of the invention). The tube end 208 is made of glass that is transparent and is electrically conductive, such as Nesa (by trade name, as developed by Pittsburgh Plate Glass Co.). The lead 42 is connected to the tube end 208 as it is to the conductive layer 28 in the forms of FIGS. 2 and 3, and the tube end 208 has a high voltage applied to it for accelerating the electrons in the beam 38 to the tube end 208. The tube end 208 is shielded from the viewer to prevent electrical shock by any suitable plate (not shown) of conventional transparent and electrically insulating glass. The beads R, G and B by virtue of being embedded in the tube end 208 form the capacitor faces 30a, 32a and 34a which correspond to these same faces in the other forms of the invention. The platings 30, 32 and 34 are on the surfaces of the beads R, G and B in the FIG. 4 showing and are opposite to the faces 30a, 32a and 34a as in the previously described forms of the invention. The ends of the filaments 202, 204 and 206 are in electrical contact with the platings 30, 32 and 34 and with the faces 30a, 32a and 34a to form the same tank circuits a, b and c as are present in the previously described embodiments of the invention.

An electrically non-conductive plastic layer 210 is present on the tube end 208 and extends to the ends of the platings 30, 32 and 34 in FIG. 4. The layer 210 is preferably of a plastic to which the material of the platings 30, 32 and 34 does not adhere, such a plastic being for example polytetrafluoroethylene (Teflon) to which nothing adheres without a mechanical interconnection and which has the lowest surface friction of all solid materials known today. Therefore, once the layer 210 has been applied on the inner surface of the tube end 208 and about the beads R, G and B in FIG. 4, the complete exposed surfaces of the beads and of the layer 210 may be sprayed with metal to provide the platings 30, 32 and 34; and the plating material may then be removed from the inner surface of the layer 210 by abrasion as by brushing. This leaves the platings 30, 32 and 34 in FIG. 4 separated and thus electrically insulated from each other. A second inner layer 212 of plastic or the like is then applied on the layer 210 and on the edges of the platings 30, 32 and 34 so as to further insulate the platings 30, 32 and 34 from each other.

The FIG. 4 form of the invention operates in the same manner as the other previously described forms. Since the filaments 202, 204 and 206 have different numbers of convolutions, the filaments in conjunction with the platings 30, 32 and 34 and the faces 30a, 32a and 34a provide tank circuits that resonate at the three frequencies $f_1$, $f_2$ and $f_3$, so that the beads in the FIG. 4 form provide the lighted, different color spots on the tube face 208 in the same manner as these spots are provided in the other forms of the invention by virtue of the three different frequency components $f_1$, $f_2$ and $f_3$ in the electron beam 38.

Figure 5:
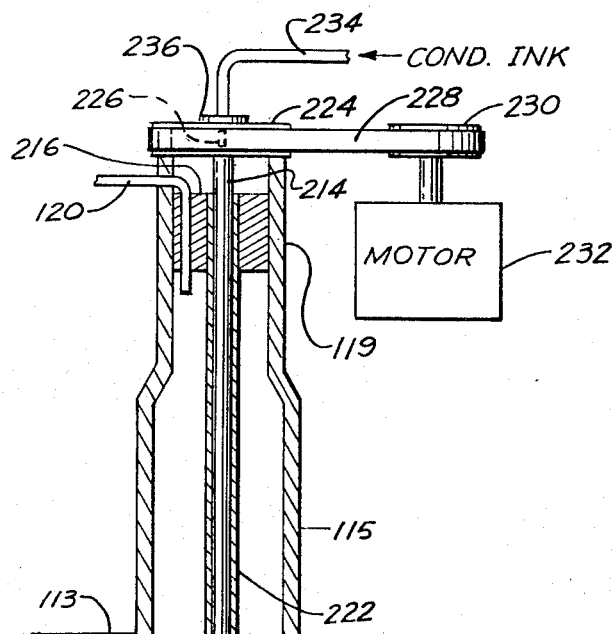
FIG. 5 is a longitudinal sectional view of a bead forming apparatus that may be used for forming light producing beads.
Figure 6:
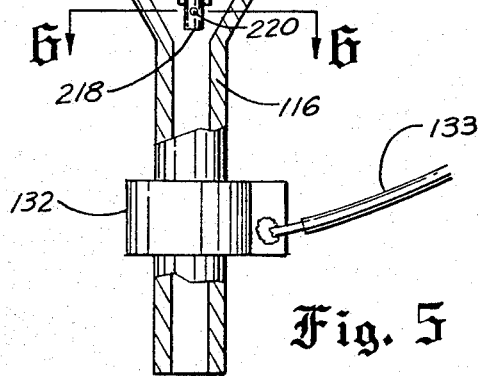
FIG. 6 is a sectional view on an enlarged scale and taken on line 6—6 of FIG. 5.

The beads R, G and B with the convoluted conductive ink filaments 202, 204 and 206 may be made using the apparatus shown in FIGS. 5 and 6. The apparatus as shown in FIG. 5 is substantially the same as that disclosed in said Jenkins U.S. Pat. No. 3,774,983 (particularly FIG. 2 thereof) except that the rotatable tube 214 has been added. Each of the parts shown in FIG. 5 hereof having a reference character in the hundred series (between 100 and 199, and thus with a "1" preceding the two last digits of the reference character) corresponds with and is similar to a part in the drawings of the Jenkins patent that has these same two digits as a reference character. For example, the reservoir 115 shown in FIG. 5 hereof corresponds to and is similar to the reservoir 15 shown the drawings of the Jenkins patent. Additional such parts in FIG. 5 hereof are the delivery tube 116 which terminates the reservoir 115 and which delivers a stream of molten material, a metering tube 113 supplying molten material to the reservoir 115, a tubular portion 119 of the reservoir 115, a vacuum pipe 120 connected with the reservoir and metallic clamp 132 connected to a transformer by means of a lead 133. These parts operate in the same manner as described in said Jenkins patent to produce spherical beads from the bottom end of the delivery tube 116, and further description of these parts and their operation will therefore not be given here.

The rotatable tube 214 functions to supply electrically conductive ink in spiral form into the molten material in the tube 116 so that the beads R, G and B produced by the FIG. 5 apparatus have the convoluted filaments 202, 204 and 206 therein. The tube 214 extends through the grommet 216 provided in the top end of the tubular portion 119 and has a closure plate 218 at its bottom. An ink discharge opening 220, which extends slantwise with respect to a radius of the tube 214, extends through the tube 214. A tube 222 encloses the tube 214 except for the lower end of the tube 214 having the opening 220 therein and is fixed in the grommet 216. A pulley 224 is fixed on the tube 214 by means of a key 226, and the pulley 224 is rotatably driven by means of a belt 228, a pulley 230 and a motor 232. Conductive ink is supplied through a pipe 234 into the tube 214 by means of a slip junction 236 connecting the pipe 234, which is stationary, with the tube 214, which is rotatable.

The FIG. 5 apparatus produces spheres from molten material which is supplied through the tube 113 as is described in said Jenkins U.S. Pat. No. 3,744,983. The molten material passes downwardly through the delivery tube 116 and emerges as globules from the bottom end of the tube 116. At the same time, conductive ink is discharged or shot through the opening 220 into the molten material in the tube 116. The ink is supplied from the pipe 234 into the tube 214 for this purpose, with the molten material passing downwardly about the lower end of the tube 214. At the same time, the tube 214 is rotated from the motor 232 in the direction X through the belt 228; and the ink emerging from the opening 220 thus forms into a spiral thread in the molten material passing downwardly through the delivery tube 116. Thus, a spiral filament 202 is formed in a bead R, for example, as the bead is formed and drops from the lower end of the tube 116 and solidifies during its drop. The other spiral filaments 204 and 206 are formed in the same manner, but the tube 214 is driven from the motor 232 at the different slower speeds necessary for forming the filaments 204 and 206 with their smaller numbers of convolutions.

Figure 7:
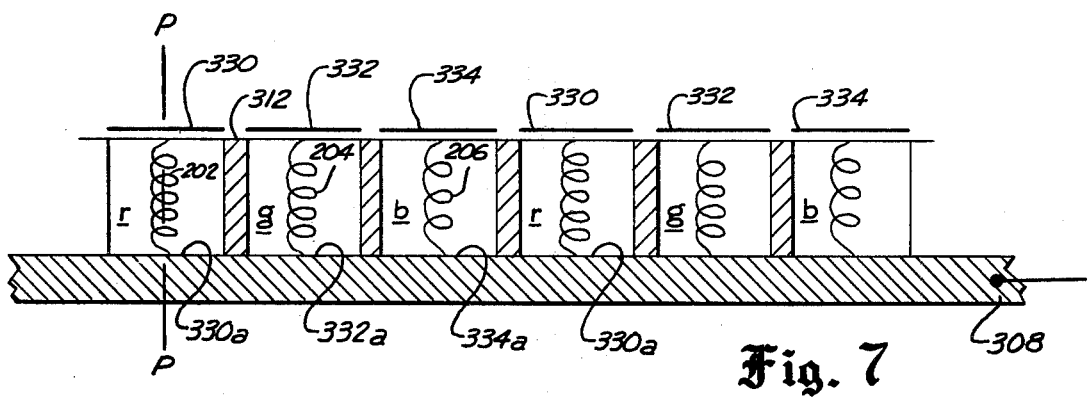
FIG. 7 is a view similar to FIG. 2 and showing alternately usable cylindrical light producing beads on the internal surface of the viewing end of the picture tube.

FIG. 7 shows a variation of the FIG. 4 embodiment including the viewing tube end 308 which is of electrically conductive, transparent glass. The beads or electron responsive elements r, g and b are cylindrical or approximately so and correspond respectively to the beads R, G and B shown in FIG. 4. The elements r, g and b have the same spirally coiled filaments 202, 204 and 206 of conductive ink extending through them as do the beads R, G and B shown in FIG. 4 and are affixed directly on to the inner surface of the viewing tube end 308. Platings 330, 332 and 334 are applied respectively on to the inner ends of the elements r, g and b and correspond to the platings 30, 32 and 34 in the other embodiments of the invention. The central axes of the cylindrical elements r, g and b, of the filaments 202, 204 and 206 and of the platings 330, 332 and 334 extend normal to the viewing tube end 308. The central axis p-p of one element r, its filament 202 and its plating 330 is shown for example in FIG. 7 as being normal to the viewing tube face 308. The ends of the filaments 202 in FIG. 7 are in electrical contact with the plating 330 and with the face 330a opposite the plating 330 for each of the elements r; and the filaments 332 and 334 are similarly in electrical contact with the opposite platings 332 and 334 and with the faces 332a and 334a for the other elements g and b. An electron barrier and insulating material 312 is applied about the elements r, g and b. The FIG. 7 form of the invention functions in the same manner as does the FIG. 4 form.

Figure 8:
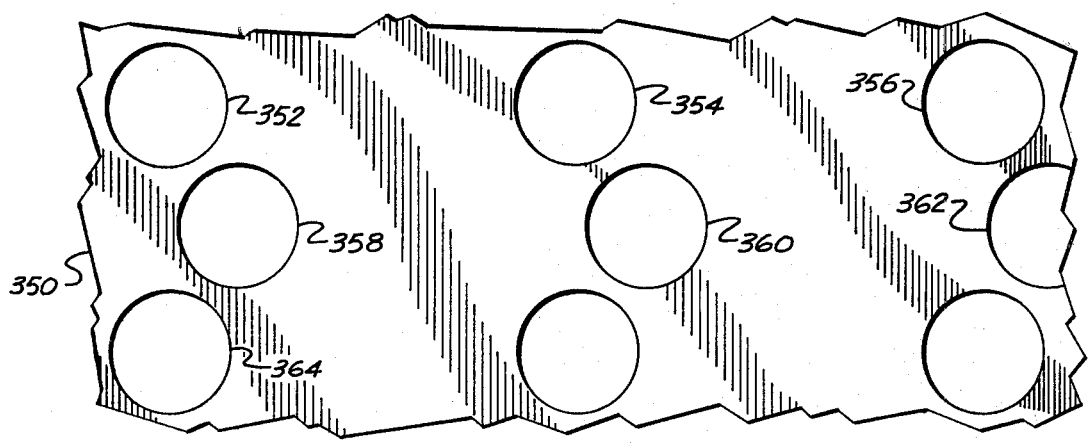
FIG. 8 is a face view of a mask usable in forming the cylindrical beads illustrated in FIG. 7.

Elements r, g and b may be applied on to the tube face 308 using the mask shown in FIG. 8 shown is simply a thin sheet with the holes 352, etc. punched through it. The mask 350 has the holes 352, 354 and 356 in one row and has the holes 358, 360 and 362 in a second row. A hole 364 is shown in a third row, which is a duplicate of the first row. The rows repeat for the length of the mask and continue for the width of the mask in the same manner and pattern. The forming apparatus of FIG. 5 may be used with the mask 350 for applying the elements r, g and b on to the internal surface of the tube end 308. The clamp 132 and lead 133 are omitted, and the material of the elements is applied to the FIG. 5 apparatus with pressure. The discharge end of the FIG. 5 apparatus is put into register with one of the holes in the mask 350, and fluent material of the element is shot through the hole on to the adjacent surface of the tube end 308. A plurality of the FIG. 5 apparatus may be used at the same time, so that fluent material may be shot through a number of the holes in the mask 250 at the same time. The mask 350 is shown in FIG. 8 in position to form the elements r, and the mask 350 may be simply shifted sidewardly for ⅓ of the distance between the centers of adjacent holes 352 and 354, each time so as to be useful to subsequently form the elements g and b. In this formation of the elements r, for example, the lower end of the FIG. 5 apparatus is preferably of the same diameter as the holes in the mask 308, and the action of the tube 214 provides the convoluted filaments 202, 204 and 206 in the same manner as the convoluted filaments are formed in the beads R, G and B of the FIG. 4 showing. After the mask 350 has been used to form the elements r, g and b, the mask 350 may then be used to form the platings 330, 332 and 334.

The apparatus of FIGS. 9 and 10 allows all of the elements r, or all of the elements g, or all of the elements b to be laid down at the same time on the viewing tube end 308. The apparatus of FIG. 9 includes a plate 450 (corresponding to the mask 350) having the holes or openings 452, 458 and 464, as well as all of the other openings that will provide an element r, for example, on all of the spots on the viewing tube end 308 to cover the complete tube end. The elements g and b will be interspersed with the elements r, as will be understood. The plate 450 has an outer rim 450a, and a cover 402 is fixed on the rim so as to form a fluid tight enclosure. The plate 450 as defined by the rim 450a has fluid outlets 404 and fluid inlets 406. Although there are only two each of these shown, there may be many others for the complete width of the plate 450. The outlets 404 are connected by a conduit 409 having a throttle valve 410 in it with a container 412 for liquid phosphorescent material of the type needed for the particular elements r, g or b being formed. The container 412 is connected by a conduit 414 having a pump 416 and a throttle valve 418 with the inlets 406. A manifold plate 420 is fixed on the bottom of the plate 450 and has a conduit 422 in its upper face that connects with a supply of electrically conductive fluid ink in container 423. A pump 424 and a throttle valve 425 are provided in conduit 422 just below the container 423. The conduit 422 has a port 426 in each of the openings 452, 458, 464, etc. in the plate 450 which extends into the opening 452, etc. at an angle to radial, such as at an angle to the center line F-F shown in connection with the opening 464 in FIG. 9, having a component in the same direction as the arrow Z in the opening 464. The plate 420 has the same openings 452, etc. as the plate 450; and these openings of the plates 450 and 420 are of the same diameters and are in register.

The plate 450 has an upstanding circular fluid redirection vane portion or rim 428 at the upper end of each of the openings 452, 458, 464, etc. in the plate 450 (see FIG. 10). Each rim 428 has a crest 430 that overlies the particular opening 452, etc. and forms a downwardly open fluid channel 432. The rim 428 extends around the particular opening 452, etc. for only 90 degrees and has an initial portion extending in the direction Y (at right angles to the center line F that extends transversely of the plate 450). The final portion of the rim 428 extends transversely of the plate 450 (in the same direction as the center line F) and merges into the top surface of the plate 450.

In operation, the fluid from the container is pumped by pump 416 through the conduit 414 and into the inlets 406. The fluid then flows longitudinally of the plate 450, in the direction Y, across the upper surface of the plate 450, constrained by the cover 402. The direction Y is the same direction as that in which the initial portion of each rim 428 extends, and the fluid thus is caught in the fluid channel 432 for each of the openings 452, etc. The fluid travels circularly (in direction Z) in the channel 432 and downwardly in the opening 452, etc., thus swirling in direction Z as the fluid passes downwardly through the opening 452, etc. in the plates 450 and 420. The end 308 of the picture tube 10 is positioned just below the plate 420, and the fluid is thus deposited on the tube end 308 in the form of a cylinder or an approximate cylinder and solidifies on the tube end 308 in cylindrical or approximately cylindrical form as one of the elements r, g or b as shown in FIG. 7. Most of the fluid passing across the plate 450 from the inlets 406 passes out of the enclosure provided by the cover 402 through the outlets 404 and through the conduit 409 to the container 412. The relative amounts of fluid that pass through the openings 458, etc. and through the outlets 404 is controlled by properly adjusting the valves 410 and 418. As the fluid swirls in direction Z in passing downwardly through the openings 458, etc., electrically conductive ink from the container 423 is injected into the swirling fluid and thus forms the convoluted filaments 202, 204 or 206 in the elements r, g or b as finally formed on the tube end 308 from these openings. The ink injection is through ports 426 and is controlled by the valve 425 throttling the output of the pump 424.

If it is desired to form the filaments 202, 204 and 206 more centrally of the elements r, g and b, a needle 434 may be inserted in each of the ports 426. Such a needle is shown in connection with the opening 452 in FIG. 9. The needle 434 is similar to a hypodermic needle, is hollow, and conducts ink from the port 426 in which it is positioned toward the center of the associated opening 452, etc. The plate 450 has its holes 452, etc. located in the same relative dispositions as the holes 352, etc. in the mask 350; and the plate 450 may thus be shifted sideways in the same manner as the mask 350 is shifted in order to form the elements g and b, once the elements r are formed, assuming of course that the elements r are formed first, using the same FIG. 9 apparatus for forming all of the elements r, g and b. The valves 410 and 418 should be adjusted each time a change is made in using the FIG. 9 apparatus for the different elements r, g and b, as will be understood.

FIG. 11 shows a modification of the FIG. 7 showing in which the viewing tube end 408 is of ordinary glass that is electrically non-conductive. The elements r, g and b are deposited on a film 436 that lies on and is supported by the viewing tube end 408. The film 436 is electrically conductive and is so thin as to be nearly transparent so that light from the elements r, g and b is apparent through the viewing tube end 408. Such a film 436 could also be used between the elements R, G and B of the FIG. 4 embodiment and the tube end 208 which in this case could be of ordinary electrically non-conductive glass.

If it is desired to enhance the inductance of the elements r, g and b, this may be accomplished by providing very thin, very flexible fibers or segments 438 (see FIG. 9) of electrically conductive material in the fluid contained in the container 412 and pumped to the plate 450 though the inlets 406. The segments 438 swirl downwardly through the openings 452, etc. and thus extend spirally, circularly and downwardly (toward tube end 308 or film 436) within the elements r, g and b in their final cylindrical forms as shown in FIG. 7 to enhance the inductance. Depending on the actual frequencies $f_1$, $f_2$ and $f_3$ that are used, the discrete filaments 202, 204 and 206 could actually be dispensed with and the fibers 438 in the completed elements r, g and b could be relied on to provide the inductance of these elements. The numbers of fibers in the elements r, g and b would preferably be different to provide the different resonant frequencies. For that matter, if very high frequencies $f_1$, $f_2$ and $f_3$ are used, both the fibers 438 and the discrete filaments 202, 204 and 206 could be dispensed with; and the natural inductance of the material of the elements r, g and b could be relied on for providing resonance at these frequencies using the opposite capacitor plates 330, 330a, 332, 332a and 334 and 334a. This natural inductance of the material of the elements r, g and b could be enhanced by adding conductive granules, such as of copper or iron, for example, to the material. Of course, the sizes of the elements r, g and b can be changed, more or less separating the opposite plates (the plates 330 and 330a, for example) in order that the elements r, g and b shall be resonant at different frequencies. Also, as is well known, even a straight wire has some inductance (the quality of an electrical current in one portion of the wire to magnetically influence the current in another portion of the wire as the current changes); and thus the convolutions in the discrete filaments 202, 204 and 206 could be dispensed with while still obtaining resonance at frequencies of $f_1$, $f_2$ and $f_3$. These same principles apply also to the forms of the invention shown in FIGS. 2, 3 and 4.

Other changes may well also be made within the scope of the invention, such as to use a conventional electromagnetically controlled single electron gun in lieu of the electrically controlled gun (including the electrostatic plates 64, 66, 68 and 70) illustrated. The phosphors for the three type of beads R, G and B and r, g and b have been described as being different so that, when these beads are electrically energized, these beads glow or light with the different colors: red, green and blue. This same result can be attained if the same type of phosphor is used on all of the beads; in particular if the same type of phosphor is used as in black and white picture tubes to produce either lighted or dark areas on the viewing face of the black and white tube. In this case, the beads R, G and B or the beads r, g and b would be made of colored materials, such as red glass, green glass and blue glass respectively, so that these beads produce red, green and blue lighted spots on the viewing face of the picture tube 10 when the phosphors of these beads are electrically energized. Although the viewing tube faces 26 and 208 in FIGS. 2-4 are shown curved and the viewing tube face 308 in FIG. 7 is shown flat, it will be understood that these figures are schematic only and that in practice these tube faces are just slightly curved as is conventional (between the curvature of the faces 26 and 208 and the flatness of the face 308).

Advantageously, the color TV picture tube 10 is less costly than the conventional shadow mask color TV tube which in particular is expensive due to the use of the three electron guns and the shadow mask, the shadow mask being especially expensive due to its necessary precision construction and placement in the tube. Also, since the tube 10, instead of having the three electron beams used by the conventional shadow mask color picture tube, has only the single electron beam 38 the three different frequency components of which produce the three primary colors on the picture tube viewing face, there is with the tube 10 no initial or later problem of electron beam registration or convergence of a plurality of beams at the viewing face of the tube.

I claim:

1. A cathode ray tube comprising an evacuated envelope having a light transmitting picture viewing face, an electron gun in said envelope positioned to direct electrons to said viewing face, and an electron responsive coating on the inside surface of said face;

said coating comprising sets of first, second and third circuits tuned to resonate at different frequencies of electron flow from said gun; and sets of first, second and third fluorescent bodies associated respectively with said first, second and third circuits and respectively providing different colors of illumination viewable through said face as said different frequencies of electron flow are applied to these circuits.

2. A cathode ray tube picture viewing face portion having small bodies or beads of a plurality of types affixed on its surface to be subject to impingement by electrons from an electron gun of the tube, said beads of the different types having different types of phosphors associated with them so that the beads of the different types emit light of different colors respectively when the beads are electrically excited, and a tank circuit associated with each bead and comprising a pair of capacitor plates on opposite surfaces of the bead and inductance providing means bridging the plates and extending through the bead, said tank circuits for the different bead types being respectively tuned to be resonant at different frequencies respectively so that different frequencies of electron flow will respectively energize the different bead types to cause them to emit light at their respective colors.

3. A cathode ray tube picture viewing face portion as set forth in claim 2, said face portion being of electrically conductive material and forming one of said opposite capacitor plates for each of said beads.

4. A cathode ray tube comprising an evacuated envelope having a light transmitting picture tube face, an electron gun in said envelope positioned to direct a beam of electrons to said viewing face, a plurality of small bodies or beads on the inside surface of said picture viewing face and having fluorescent material of different types associated with them so that some of the beads emit light of a first, certain color when electrically energized and others of the beads emit light of a second, different color when electrically energized, tuned electrical circuits associated with said beads emitting light of said first color tuned to be resonant at a first frequency of the electron beam from said gun, and tuned electrical circuits associated with said beads emitting light of said second color tuned to be resonant at a second, different frequency of the electron beam from said gun, whereby the electrons of said beam when at said first and second frequencies respectively cause said beads to emit light at said first and second colors.

5. A cathode ray tube as set forth in claim 4 and including also a plurality of beads on the inside surface of said picture viewing face having fluorescent material of still a different type associated with them so that they emit light of a third color when electrically energized, and tuned electrical circuits associated with these beads tuned to be resonant at a third frequency of said beam whereby the electrons of said beam when said third frequency causes these beads to emit light of the third color.

6. A cathode ray tube as set forth in claim 5, each of said beads being of dielectric material and said tuned circuits constituting a pair of capacitor plates on opposite sides of each of said beads and at least one inductance providing conductive filament extending through the bead and electrically connecting the pair of plates together.

7. A cathode ray tube comprising an evacuated envelope having a light transmitting viewing face with an electron beam responsive inside surface, and an electron gun in said envelope positioned to direct a beam of electrons to said surface, said surface comprising components which are in sets of different frequency response and different color production capabilities when electrically energized, with said component sets being responsive to different frequencies of electron flow from said gun to produce visual indications of different colors respectively through said viewing face when excited by electron flow from said gun of said different frequencies, said components constituting small bodies or beads having fluorescent material incorporated with them and having tuned electrical circuits causing the fluorescent material to emit light when the tuned circuits are energized at said different frequencies of electron flow.

8. A cathode ray tube as set forth in claim 7, said tuned circuits including opposite capacitor plates on opposite surfaces of each of said beads and said beads being of dielectric material.

9. A cathode ray tube as set forth in claim 7, said tuned circuits including opposite capacitor plates on opposite surfaces of each of said beads and said beads being of dielectric material and means providing inductance effectively connecting said plates together.

10. A cathode ray tube as set forth in claim 7, said tuned circuits including opposite capacitor plates on opposite surfaces of each of said beads and said beads being of dielectric material and fibers of electrically conducting material extending in spiral disposition through said beads and providing inductance effectively connecting said plates together.

11. A cathode ray tube as set forth in claim 7, said tuned circuits including opposite capacitor plates on opposite surfaces of each of said beads and said beads being of dielectric material, and coiled electrical inductors electrically connecting said opposite plates together and extending through the bead.

12. A cathode ray tube as set forth in claim 11, one of said plates on each of said beads facing said gun to have said electrons impinging on it and the other of said plates being at said viewing face.

13. A cathode ray tube as set forth in claim 11, each of said beads being at least approximately in the form of cylinders, the center lines of said cylinders and said inductors being normal to said light transmitting viewing face.

14. A cathode ray tube as set forth in claim 13, one of said plates on each of said beads facing said gun to have said electrons impinging on it and the other of said plates being at said viewing face.

15. A cathode ray tube as set forth in claim 7, said small bodies or beads having the same type of fluorescent material incorporated in them and the beads of said different sets being of colored glass-like material of said different colors for the different sets respectively so that the light from the beads of the different sets is of said different colors.

16. A cathode ray tube as set forth in claim 7, said tuned circuits including opposite capacitor plates on opposite surfaces of each of said beads and said beads being of dielectric material and electrical inductors electrically connecting said opposite plates together, said light transmitting viewing face being of electrically conductive material and forming one of said capacitor plates for each of said beads.

17. In a cathode ray tube having an evacuated envelope with a light transmitting picture viewing face and an electron gun in said envelope positioned to direct electrons to said viewing face, the improvement which comprises:

a coating on the inside surface of said viewing face having components in sets of different frequency and color response with said sets being responsive to different frequencies of electron flow from said gun to produce visual indications of different colors respectively through said viewing face when excited by electron flow from said gun of said different frequencies, each of said components including a bead of dielectric material, a pair of capacitor plates on opposite sides of said bead and inductors extending through the bead and electrically connecting the plates together, said plates and inductors forming an electrical circuit tuned to the frequency of the component set of which the component is a part.

18. In a method providing a color picture on a single electron gun cathode ray tube having a light transmitting picture viewing face, the steps which comprise:

providing a frequency responsive, light producing coating on the inside surface of said viewing face having components which are in sets of different frequency and color response with said component sets being responsive to different frequencies of electron flow from said gun to produce indications of different colors respectively through said viewing face when excited by electron flow from said gun of said different frequencies, and selectively varying electron flow from said gun to cause it to be at said different frequencies to cause said different component sets to selectively emit light at said different colors, said components comprising beads of dielectric material, a pair of capacitor plates on opposite sides of each bead and inductors extending through the bead, said plates and inductors of each bead providing a circuit which is tuned to resonate at the frequency of the component set of which the bead is a part.

* * * * *